Feb. 20, 1962 A. R. HOLLISTER 3,021,705
PNEUMATIC GAGING DEVICE
Filed Dec. 10, 1958 2 Sheets-Sheet 1

INVENTOR.
ALLEN R. HOLLISTER
BY
Joseph K. Schofield
ATTORNEY

Feb. 20, 1962  A. R. HOLLISTER  3,021,705
PNEUMATIC GAGING DEVICE
Filed Dec. 10, 1958  2 Sheets-Sheet 2

INVENTOR.
ALLEN R. HOLLISTER
BY
Joseph M. Schofield
ATTORNEY

3,021,705
Patented Feb. 20, 1962

3,021,705
PNEUMATIC GAGING DEVICE
Allen R. Hollister, East Hartford, Conn., assignor to Pratt & Whitney Company, Incorporated, West Hartford, Conn., a corporation of Delaware
Filed Dec. 10, 1958, Ser. No. 779,423
4 Claims. (Cl. 73—37.9)

This invention relates to an improved gaging device utilizing fluid-flow principles to determine a dimensional parameter of a work product.

In the practice of the invention there is provided a gaging device comprising a primary gaging circuit including a gaging plug member, and first and second fluid supply sources, said gaging plug member having orifice means arranged in opposed relation to a surface of a work piece to be gaged. The second fluid supply source is connected with the orifice means. First and second fluid amplifier means are connected in cascade. Means are arranged for connecting the first fluid amplifier means with the orifice means, whereby the amplified output of the second amplifier means is a function of the dimension of the workpiece being gaged, and an indicator serves to indicate variations in said output.

One object of this invention is to provide an improved gaging device which has an amplified linear response over a wide range.

Another object is to provide an improved gaging device which can be adjusted with celerity and over a wide range.

A further object is to provide an improved gaging device which is simple of construction and inexpensive to manufacture.

The novel features which are believed to be characteristic of this invention are set forth with particularity in the appended claims. The invention itself, however, both as to its organization and method of operation, together with further objects and advantages thereof, may best be understood by reference to the following description when read in connection with the accompanying drawing in which:

Figure 1:
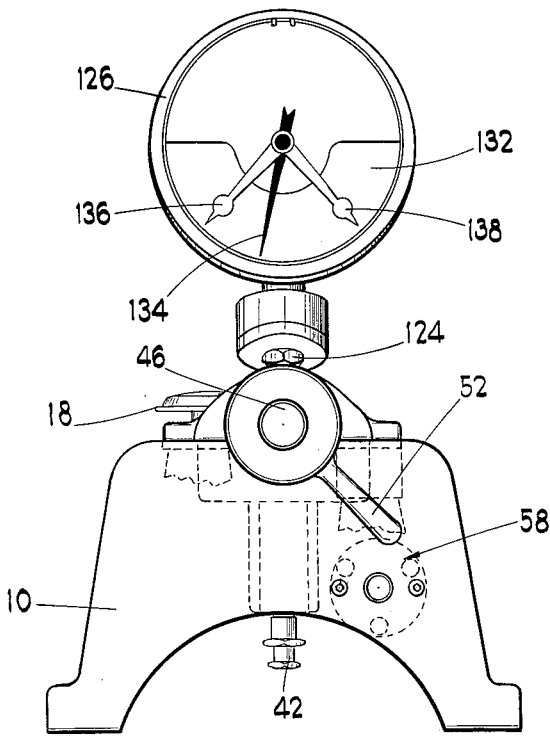
FIGURE 1 is a front pictorial view showing the improved gage in accordance with one illustrative embodiment of the invention.
Figure 2:
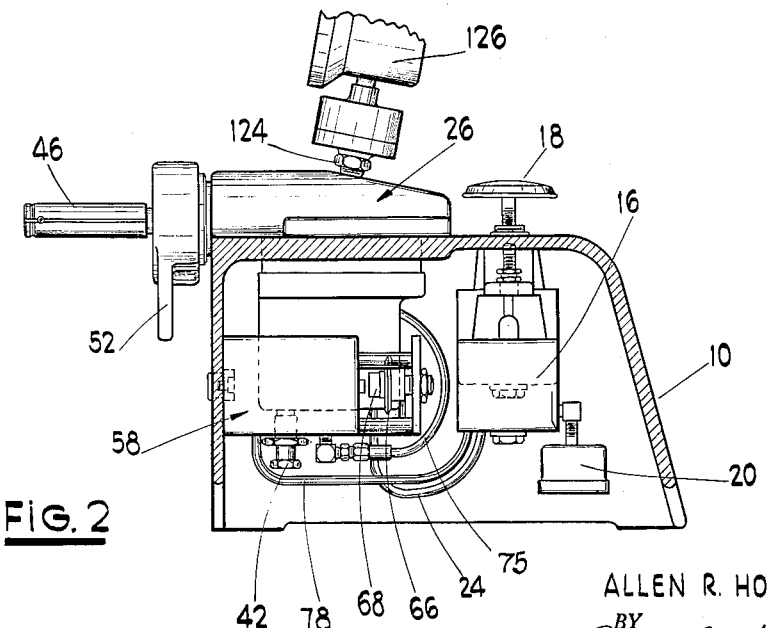
FIG. 2 is a side pictorial view, partly in section, of the improved gage shown in FIG. 1.
Figure 3:
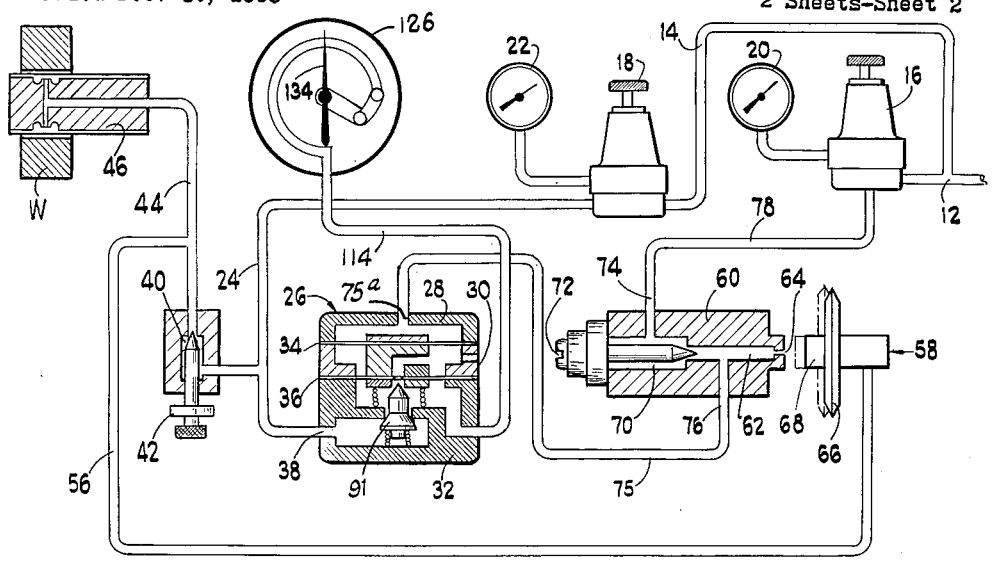
FIG. 3 is a schematic diagram illustrating the basic fluid circuitry of the illustrated gaging device.

Referring now to the drawings, and to FIG. 3 in particular, the various components which comprise the gaging device are supported within and upon a cast housing 10 as shown in FIGS. 1 and 2. Fluid under pressure is supplied through a pair of conduits 12, 14 to first and second adjustable regulators 16, 18, which constitute first and second sources of fluid supply respectively. In this embodiment the fluid employed is air under pressure; however, any other non-corrosive fluid may also be used with equal facility. The regulated air pressure is indicated on appropriate gages shown symbolically at 20, 22 respectively.

The air from regulator 18 flows through a conduit 24 to a second fluid amplifier means or diaphragm-area ratio amplifier indicated generally at 26; the amplifier unit comprises three separate housing units 28, 30 and 32 secured together so as to support a pair of diaphragms 34, 36 in spaced relation in a manner which will be subsequently described.

The diaphragm-area ratio amplifier 26 includes a passage 38 communicating with conduit 24; from this passage 38 the air is conveyed to an air restriction passage 40, the cross-sectional area of which may be varied by means of adjustable screw 42. Beyond the air restriction passage 40, the air is conveyed via a longitudinal passage 44 to a gaging plug member 46 (not shown in FIG. 4).

Figure 4:
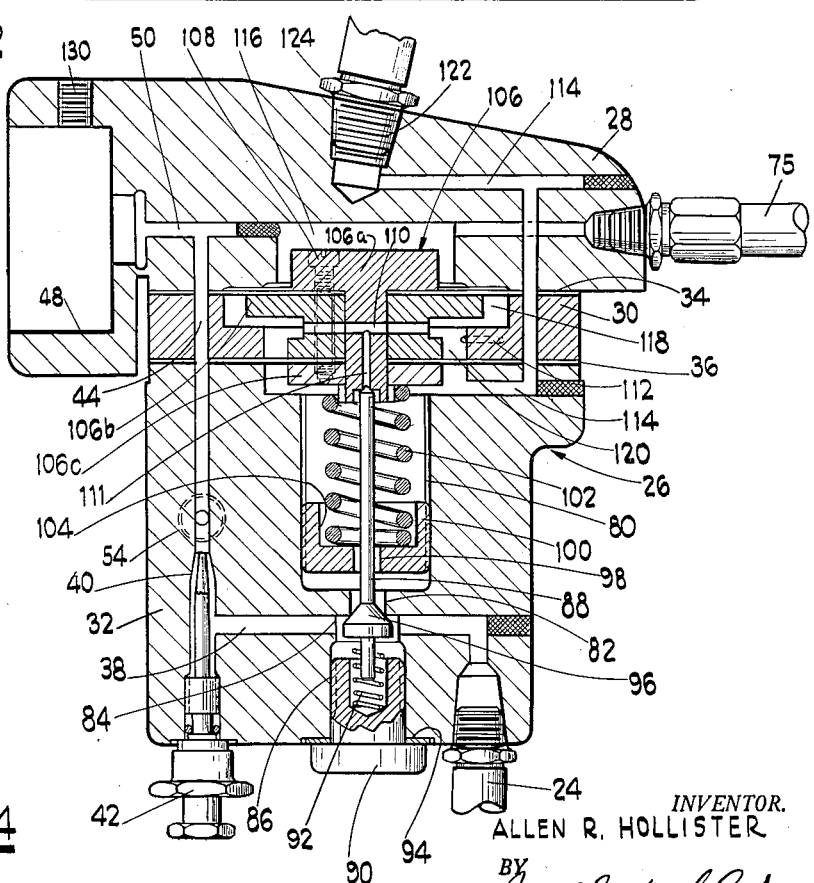
FIG. 4 is a sectional view of the diaphragm-area ratio amplifier means utilized in the said illustrated embodiment.

As may be seen in FIG. 4, the diaphragm-area ratio amplifier 26 is recessed at 48 to receive a Jacobs chuck (not shown), and it includes a horizontal passage 50 which is adapted to communicate with the passage 44. The gaging plug 46 is adjusted within the chuck by means of a wrench 52 (FIGS. 1, 2).

The air in passage 44 is also conveyed via a suitable conduit 54 and flexible piping 56 to the first fluid amplifier means or back-pressure amplifier indicated generally at 58. This latter amplifier comprises a block member 60 having a longitudinal passage 62 terminating in an air nozzle 64. A bellows member 66 having an anvil 68 is arranged in proximity to the air nozzle member 64. The piping 56 communicates pneumatically with the bellows 66, so that these bellows, and hence the anvil member 68, may be variably displaced toward or away from the air nozzle member 64 in response to variable pneumatic pressures conveyed to it by means of piping 56. An increase in pressure in conduit 56, as when the workpiece being gaged is slightly oversize, expands the bellows 66 and moves the anvil 68 closer to the face of nozzle 64. The block member 60 includes an air restriction passage 70 communicating with passage 62; the cross-sectional area of said passage 70 may be varied by means of adjusting screw member 72 as shown symbolically on the drawing. Further, member 60 includes passages 74 and 76 which communicate with passages 70 and 62 respectively. By means of flexible piping 78, passage 74 is connected to the first air supply source (regulator 16); similarly passage 76 is connected by flexible tubing 75 to an inlet 75a to the diaphragm-area amplifier 26 as shown.

The diaphragm-area ratio amplifier is shown in greater detail in FIG. 4. The part 32 is centrally bored to provide the variously sized diameters at 80, 82, 84 and 86 respectively. A valve member 88 is mounted for axial displacement within these successive borings. The bore 86 is closed by a plug member 90 which is centrally recessed to receive a spring 92 which biases the valve member 88 in an upward direction as viewed in FIG. 4. A washer 94 provides an air tight seal for the plug member 90.

The valve member 88 contains an elarged tapered portion at 96 so that in the position of its uppermost displacement the portion 96 effectively seals off the bore 82. The stem portion of the valve member 88 passes upwardly through an enlarged hole 98 in member 100, the latter providing an effective seat for the spring 102 by means of recess 104.

A diaphragm support member is indicated generally by numeral 106. This member 106 is in three parts: 106a, 106b and 106c. The diaphragms 34, 36 are assembled together for simultaneous movement in the same direction with parts 30 and 106 as shown, the component member 106 and part 30 being held together in any convenient manner such as by a bolt 108. The member 106 contains passages 110, 111 which are normal to each other; these passages are vented to atmosphere through opening 112. Upward movement of the diaphragms 34 and 36 serves to open the valve at the upper end of member 88 so that air may flow from the space below diaphragm 36 to the space between the diaphragms. Any build-up of pressure within the space between the diaphragms is prevented by this space being vented to atmosphere by passage 112.

The housing units 28, 30 and 32 are suitably machined so as to provide a passage 114. Housing unit 28 is machined to provide a recess at 116; similarly housing unit 30 is provided with annular recesses at 118 and 120 as shown.

The housing unit 28 is threaded at 122 to receive a suitable fitting 124 to which the indicator 126 (FIGS. 1, 2) is connected. Further, unit 28 is threaded at 130 to receive a set screw for the purpose of holding the Jacobs chuck in position.

Referring back to FIG. 1 to complete the description, the indicator 126 contains a card 132 of suitable scale, a needle 134 to indicate the magnitude of the dimension being measured, and a pair of adjustable dial hands 136, 138 which are manually adjusted to indicate the acceptable range of tolerance.

The operation of the instant dimension gage should be clear at this point. Referring now to FIG. 3 in particular, a workpiece W is placed in position with respect to the gaging plug member 46. In the embodiment herein illustrated, the workpiece W is a ring, the internal diameter of which is to be measured.

Air under pressure is fed from the second source of supply through regulator 18 to restriction 40 by means of conduit 24, and to the gaging plug member 46. In accordance with well-known pneumatic-flow principles, the workpiece W variably permits the air in passage 44 to escape to the atmosphere in accordance with the magnitude of its respective internal diameter, and back pressure is developed in passage 44 which varies inversely with the dimension being gaged, i.e., the inside diameter.

The back pressure amplifier 58 is supplied with air from a first source of supply (regulator 16) where it flows through passage 78, the flow of which may be restricted by means of adjusting screw 72. The air then flows through passage 62 and nozzle member 64 to atmosphere.

The back pressure developed in passage 44 is conveyed by means of flexible tubing 56 to bellows member 66 of the amplifier 58. This latter flow causes the bellows 66 to be displaced (and hence the anvil 68 is displaced in like manner) so that the distance between the anvil 68 and the nozzle member 64 is reduced. Accordingly, an amplification of the pressure in passage 62 takes place and this amplified pressure is then conveyed by flexible piping 75 to the diaphragm-area ratio amplifier 26.

The diaphragm-area ratio amplifier 26 is energized by the second source of air supply (regulator 18) through conduit 24 and passage 38. The air pressure from the output of the first amplifier means 58 tends to force diaphragm 34 of the second amplifier means 26 in a downward direction as viewed in FIG. 3. The downward travel of the valve 88 by downward movement of the diaphragms 34 and 36 opens the valve port which comprises the tapered portion 96 and the lower periphery of bore 82. As a result of this action the air pressure builds up in the lower chamber defined by bore 80; pressure build-up continues until a condition of equilibrium is again established between the diaphragm pair 34, 36.

The diaphragms 34, 36 experience the same force in the equilibrium position, but since their respective areas as shown are in the ratio of 2:1, the pressure exerted on diaphragm 36 is double that of 34, and hence, the pressure applied to the indicator 126 from below diaphragm 36 is double that provided by the first fluid amplifier means.

Various modifications of the illustrative embodiment shown in the drawing, and various equivalents or substitutes for the elements thereof, will readily occur to those versed in the art, without departing from the spirit or scope of the instant invention. The disclosure, therefore, is for the purpose of illustrating the principles of the invention which is not to be regarded as limited except as indicated by the scope of the appended claims.

I claim as my invention:

1. A gaging device comprising a primary gaging circuit including a gaging plug member, first and second fluid supply sources said gaging plug member having orifice means arranged in opposed relation to a surface of a workpiece being gaged, and means connecting said second fluid supply source with said orifice means, a first and a second fluid amplifier means connected in cascade said second amplifier means including a differential diaphragm controlled outlet, means connecting said first fluid amplifier means with said orifice means, whereby the output of the second fluid amplifier means is a function of the dimension of the workpiece being gaged, and means to indicate variations in said output.

2. A gaging device comprising a primary gaging circuit including a gaging plug member, first and second fluid supply sources, said gaging plug member having orifice means arranged in opposed relation to a surface of a workpiece being gaged, and means connecting said second fluid supply source with said orifice means, a first and a second fluid amplifier means connected in cascade said second amplifier means including a differential diaphragm controlled outlet, means connecting said first fluid amplifier means with said orifice means, and indicator means connected to the output of the second amplifier means.

3. A gaging device according to claim 1 in which said first fluid amplifier means comprises a nozzle member, a bellows member, an anvil carried by said bellows member and disposed in opposed spaced relation to said nozzle member, and conduit means connecting said nozzle member with said second fluid amplifier means.

4. A gaging device according to claim 1 in which said second fluid amplifier means comprises a housing, first and second diaphragm members mounted in opposed spaced relationship and adapted to move in unison within said housing, the volumetric enclosure between said first and second diaphragm members being vented to atmosphere, a first passage in said housing for applying the fluid signal from said first fluid amplifier means to said first diaphragm member, a second passage in said housing connected to said second fluid supply source, and valve means cooperating with said first and second diaphragm members for variably venting fluid under pressure from the volumetric enclosure between said first and second diaphragm members, and an outlet means in said housing communicating with the side of said second diaphragm member remote from said volumetric enclosure, whereby the fluid pressure in the outlet means is a function of the ratio of the area of second diaphragm member to the area of the first diaphragm member.

References Cited in the file of this patent

UNITED STATES PATENTS

| | | |
|---|---|---|
| 2,486,052 | Moore | Oct. 25, 1949 |
| 2,877,643 | Dexter | Mar. 17, 1959 |
| 2,889,704 | Baker | June 9, 1959 |